United States Patent [19]

Draper et al.

[11] 4,443,570

[45] Apr. 17, 1984

[54] ASPHALT COMPOSITIONS

[75] Inventors: Homer L. Draper; Floyd H. Holland; Robert L. Brost, all of Bartlesville, Okla.

[73] Assignee: Phillips Petroleum Company, Bartlesville, Okla.

[21] Appl. No.: 399,108

[22] Filed: Jul. 16, 1982

[51] Int. Cl.$^3$ .......................... C08K 5/01; C08L 91/08; C08L 95/00
[52] U.S. Cl. ........................................ 524/62; 524/68
[58] Field of Search .................... 524/62, 68; 106/273, 106/278

[56] References Cited

U.S. PATENT DOCUMENTS

| 2,815,296 | 12/1957 | Young et al. ............... 106/273 R |
| 3,345,323 | 10/1967 | Endres et al. ................... 524/547 |
| 3,615,803 | 10/1971 | Draper et al. .................... 106/280 |
| 3,856,732 | 12/1974 | Bresson et al. ............. 260/28.5 AS |
| 3,931,439 | 1/1976 | Bresson et al. .................... 428/265 |
| 4,172,061 | 10/1979 | Bresson ...................... 260/28.5 AS |
| 4,371,400 | 2/1983 | Muller ............................... 106/273 |

FOREIGN PATENT DOCUMENTS 740027 8/1966 Canada ................................. 524/62

*Primary Examiner*—Theodore Morris

[57] ABSTRACT

An improved asphalt containing composition having desirable softening point and low temperature properties are prepared by incorporating into the asphalt a hydrogenated rubber, e.g., a hydrogenated styrene vinyl aromatic copolymer, a petroleum solvent, and an essentially amorphous silica.

11 Claims, No Drawings

ASPHALT COMPOSITIONS

This invention relates to improved asphaltic compositions. More specifically, the invention relates to asphalt-containing compositions exhibiting desirable high temperature and low temperature properties. In accordance with another aspect, this invention relates to asphalt compositions having softening points of above 140° F., and which are also pliable at low temperatures comprising asphalt, hydrogenated rubber, petroleum solvent, and amorphous silica. In accordance with another aspect, this invention relates to a process for producing asphalt compositions having softening point and pliability properties meeting specification requirements comprising a blend of asphalt, hydrogenated rubber, solvent and essentially amorphous silica.

BACKGROUND OF THE INVENTION

Asphalt compositions containing rubber and other additives are well known. These compositions have a wide variety of features, including joint fillers, roofing mastic, automobile undercoating, tree dressing, pipe coating, sealant compositions, and the like. The asphalt compositions preferred for the different features all have basic property requirements. For example, a suitable joint filler should have two basic properties, namely, (1) a softening point above 140 F. to withstand pavement temperatures in hot weather without slumping, and (2) be sufficiently pliable at cold temperatures of the order of −20° F. The invention relates to asphaltic compositions including the above basic properties.

Accordingly, an object of this invention is to provide asphalt compositions having a softening point of about 140° F. so as to withstand summer temperatures without slumping.

Another object of this invention is to provide asphalt compositions that are pliable at low temperatures to allow applications in cold winter weather.

Another object of this invention is to provide asphalt compositions suitable for applications as joint filler, roofing mastic, automobile undercoating, tree dressing, pipe coating, sealant mixtures, and the like.

Other objects, aspects, as well as the several advantages of the invention, will be apparent to those skilled in the art upon reading the specifications and the appended claims.

SUMMARY OF THE INVENTION

According to the present invention, there is provided an improved asphaltic composition comprising an asphalt, a hydrogenated rubber, a solvent, and essentially amorphous silica.

More specifically, according to the invention, there is provided an asphalt composition having a softening point above 140° F. comprising an asphalt material, a hydrogenated diene-vinylarene copolymer petroleum solvent, and an essentially amorphous silica.

Still according to the invention, there is provided a method for preparing asphalt compositions comprising asphalt, hydrogenated rubber, solvent, and essentially amorphous silica. The compositions are prepared by blending together the above-defined ingredients and, in a preferred embodiment, by first admixing hydrogenated rubber with the solvent and then with the asphalt and silica.

PREFERRED EMBODIMENT

The asphalt employed in this invention can be any of the well known bituminous substances derived from petroleum, shale oil, coal tar, and the like. Commonly, the asphalt is prepared by vacuum distillation of a topped crude oil. Preferably, the asphalt has a penetration (according to ASTM D5) at 77° C. ranging from about 20 to 200, more preferably, from about 70 to 100.

The rubbery polymers of the present invention prior to hydrogenation can be prepared by any of the conventional techniques known in the art. For example, a mixture of monomers comprising conjugated diene, such as butadiene, and a vinyl aromatic, such as styrene, can be polymerized using an organometallic catalyst system to produce the desired rubbery polymer. The hydrogenation of the polymer, i.e., rubbery copolymer, can be carried out in any manner known in the art. For example, the rubbery polymers or copolymers of the invention can be hydrogenated over suitable catalysts, e.g., nickel, kieselguhr, and the like, under conditions that will substantially remove olefinic unsaturation. The hydrogenated polymers, especially the butadiene/styrene copolymers of the present invention are polymers which have been sufficiently hydrogenated to remove substantially all of the olefinic unsaturation, leaving only the aromatics, i.e., phenyl group unsaturation. The extent of hydrogenation of the olefinic bonds and of the phenyl groups in the polymers can be determined by infra-red analysis before and after hydrogenation.

The hydrogenation diene-vinylarene copolymers employed in this invention can be prepared by hydrogenating a copolymer of a conjugated diene such as 1,3-butadiene, isoprene, 2,3-dimethylbutadiene, and the like, and a vinylarene such as styrene, alphamethylstyrene, vinyltoluene, and the like. The presently preferred copolymers of this invention are hydrogenated butadiene-styrene random block or radial block copolymers such as those described as viscosity index improvers in U.S. Pat. Nos. 3,432,323; 3,554,911 and 4,116,917, all herein incorporated by reference. The most preferred hyrogenated diene-vinylarenes copolymers are those containing from about 50 to 65 weight percent of styrene and 50–35 weight percent of butadiene, marketed as Phil-Ad ® VII by Phillips Petroleum Company, and described in greater detail in U.S. Pat. No. 3,554,911.

Among the hydrocarbon solvents which can be used are hydrocarbon distillates, such as high-flash naphthas, kerosene, cracking distillates, cycle oils, and virgin gas oils. The preferred solvent is known as "Stoddard Solvent" having a flash point of at least 100° F. and an initial boiling point of about 300° F.

The silica employed in this invention can be any of the naturally occurring or synthetic essentially amorphous silicas having a density ranging from about 1.8 g/cc to about 2.8 g/cc, such as diatomaceous earth (kieselguhr), precipitated silica, and fumed amorphous silica. The presently preferred silica is diatomaceous earth having a density ranging from about 1.9 g/cc to about 2.4 g/cc, a surface area (measured by nitrogen adsorption) of about 20–40 $m^2$/gram, and a particle size ranging from about 1 micron to 40 microns.

The asphaltic compositions contain the various ingredients in varying amounts depending upon ultimate utility and the particular purity of the individual constituents making up the compositions. According to the invention, the amounts of each of the ingredients is so balanced that the ultimate composition meets the softening point and pliability requirements. Generally, our inventive asphalt compositions contain (a) from about 55 to about 65 percent by weight, most preferably 58 to 62 percent by weight, of asphalt, (b) from about 17 to about 21 percent by weight of a hydrogenated butadiene-styrene copolymer, (c) from about 16 to about 20 percent by weight of a petroleum solvent, and (d) from about 2 to about 4 percent by weight of essentially amorphous silica.

The mixing of the asphaltic hydrogenated rubber solvent and silica can be accomplished using any desired procedure to produce a homogenous dispersion. For preparation of the composition of the invention, it is now generally desirable to premix the hydrogenated rubber with the petroleum solvent prior to mixing with the asphalt and silica. Specifically, the masterbatch blend of the hydrogenated rubber and petroleum solvent are made at temperatures in the range of about 280-300 F. The final blends with the masterbatch of rubber and solvent can be made at approximately 300° F. with the asphalt and silica filler.

Our inventive asphalt compositions can be prepared by any suitable mixing means and mixing order. Preferably the hydrogenated butadiene-styrene copolymer is first dissolved in the petroleum solvent and then mixed with asphalt and silica.

The following examples are intended to further illustrate our invention. However, particular materials, ratios and procedures should be considered exemplary and not limitive of the reasonable scope of this invention.

EXAMPLE

This example describes the preparation and performance parameters of our inventive asphalt blends and of two control blends. Materials used were:

(1) Asphalt having a penetration at 77° F. of 88, determined according to ASTM D5; a softening point of 114° F., determined according to ASTM D36, a ductility of over 150 at 77° F. and of 11 at 39° F., determined according to ASTM D113.

(2) Hydrogenated butadiene-styrene copolymer, having a bound styrene content of 59 percent by weight, a residual unsaturation of less than 2% as determined by IR absorption at 10.35 microns, an inherent viscosity of 0.8 (determined with a Medalia viscometer using a screened solution of 0.2 gram of the copolymer in 100 ml of toluene), and an approximate molecular weight Mn of 65,000; marketed by Phillips Petroleum Company as Phil-Ad ® viscosity index improver (VII).

(3) Stoddard Solvent, having a minimum flash point of 100° F., an initial boiling point of at least 300° F., a maximum dry point of 407° F., a maximum residue of 1.5 weight percent, and a maximum bromine number of 5.0.

(4) Diatomaceous earth having a surface area, determined by nitrogen adsorption, of 29.3 m²/gram, a particle size ranging from 1.0 to 40 microns; consisting mainly of amorphous opal with some quartz particles being present (as identified by scanning electron microscopy); marketed by Johns Manville Company Homogeneous asphalt blends were prepared by first dissolving Phil-Ad ® VII in Stoddard Solvent and then manually mixing this solution with asphalt and diatomaceous earth for about 2 to 3 minutes.

The softening point of these blends were determined according to ASTM D36. The flexibility (pliability) at low temperature was determined as follows: a deep groove of about ¼" width was sawed into a 2" wide concrete block strip, the groove was filled with the prepared asphalt blends; the concrete block strip was placed into a freezer at −20° F. overnight; pressure was applied to the cold concrete block strip on both sides of the asphalt-filled groove. If the block broke completely apart in the groove containing the asphalt blend, said asphalt blend failed this cold pliability test. If the concrete portion of the block broke but was held together by a flexible joint of asphalt blend, said asphalt blend passed this cold pliability test.

Test data are listed in Table I.

TABLE I

| | Run 1 (Control) | Run 2 (Control) | Run 3 (Invention) | Run 4 (Invention) |
|---|---|---|---|---|
| A. Composition | | | | |
| Asphalt, weight-% | 60 | 70 | 62 | 58 |
| Phil-Ad ® VII, weight-% | 20.6 | 15.9 | 18 | 20 |
| Stoddard Solvent, weight-% | 14.4 | 11.1 | 17 | 19 |
| Diatomaceous Earth, weight-& | 5 | 3 | 3 | 3 |
| B. Tests | | | | |
| Softening Point, °F. | 203 | 125 | 142 | 142 |
| Cold Pliability Test | Failed | — | Passed | Passed |

Data in Table I show that the inventive blends of Runs 3 and 4 met both requirements for satisfactory performance as joint fillter and similar applications: a softening point about 140° F. and pliability (flexibility) at −20° F.

We claim:

1. An asphaltic composition having a softening point of at least about 140° F. and which is pliable at low temperatures (below freezing) consisting essentially of
   (a) about 55-65 weight percent of an asphalt,
   (b) about 17-21 weight percent of a hydrogenated rubber,
   (c) about 16-20 weight percent of a petroleum solvent, and
   (d) about 2-4 weight percent of essentially amorphous silica.

2. A composition according to claim 1 wherein (b) is a hydrogenated conjugated diene/vinyl aromatic rubber copolymer.

3. A composition according to claim 1 wherein (d) is diatomaceous earth.

4. A composition according to claim 3 wherein (b) is a hydrogenated butadiene/styrene copolymer.

5. A composition according to claim 4 wherein (b) has bound styrene content of about 59 percent by weight and a molecular weight of about 65,000 and wherein the amount of (a) present ranges from about 58-62 weight percent.

6. A composition according to claim 1 wherein
   (a) is present in amount ranging from about 58-62 weight percent,
   (b) is hydrogenated butadiene-styrene copolymer having a bound styrene content of about 50-65 weight percent and the amount present ranges from about 18-20 weight percent,
   (c) is Stoddard solvent having a minimum flash point of 100° F. and an initial boiling point of at least 300° F., and the amount present ranges from about 17-19 weight percent, and
   (d) is diatomaceous earth and the amount present is about 3 weight percent.

7. A process of producing asphalt compositions having softening point and pliability properties meeting specification requirements which comprises blending together components (a), (b), (c) and (d) of claim 1 in the amounts defined therein.

8. A process according to claim 7 wherein (b) is dissolved in (c) and the resulting solution is then blended with (a) and (b).

9. A process according to claim 7 wherein the amount of
(a) ranges from about 58–62 weight percent,
(b) ranges from about 18–20 weight percent,
(c) ranges from about 17–19 weight percent, and
(d) is about 3 weight percent.

10. A process according to claim 7 wherein (b) is a hydrogenated conjugated diene/vinyl aromatic copolymer.

11. A process according to claim 10 wherein (b) is a hydrogenated butadiene/styrene copolymer, (c) is Stoddard solvent and (d) is diatomaceous earth.

* * * * *